United States Patent [19]

Turbak et al.

[11] 3,833,022
[45] Sept. 3, 1974

[54] MATTE FINISH SAUSAGE CASING

[75] Inventors: Albin F. Turbak; N. O. O'Brien; William H. Goodenow, all of Danville, Ill.

[73] Assignee: Tee-Pak, Inc., Chicago, Ill.

[22] Filed: July 24, 1972

[21] Appl. No.: 274,367

[52] U.S. Cl. ............... 138/118.1, 106/164, 106/168, 117/62.2, 117/94, 117/95, 117/144, 117/144.5, 117/155 UA, 117/156, 117/157, 264/173, 426/135, 426/138, 426/105
[51] Int. Cl. ............................................. A22c 13/00
[58] Field of Search ...... 99/176; 106/164, 165, 166, 106/168; 117/144, 144.5, 165, 62.2; 138/118.1

[56] References Cited
UNITED STATES PATENTS

| | | | |
|---|---|---|---|
| 1,552,422 | 9/1925 | Dasher | 106/164 |
| 2,039,303 | 5/1936 | Dreyfus | 106/166 |
| 2,039,307 | 5/1936 | Dreyfus | 106/166 |
| 2,961,323 | 11/1960 | Underwood | 138/118.1 |
| 3,110,602 | 11/1963 | Politzer et al. | 106/164 |
| 3,135,613 | 6/1964 | Underwood | 138/118.1 |
| 3,318,990 | 5/1967 | Kajitam | 106/164 |
| 3,427,168 | 2/1969 | Turbak et al. | 99/176 |
| 3,481,764 | 12/1969 | Matsumoto | 117/62.2 |
| 3,532,534 | 10/1970 | Wolff | 117/62.2 |
| 3,650,805 | 3/1972 | Imoto | 117/62.2 |
| 3,658,560 | 4/1972 | Rose | 117/144 |

FOREIGN PATENTS OR APPLICATIONS

| 37,527 | 1962 | Japan | 106/168 |
|---|---|---|---|

OTHER PUBLICATIONS

Condensed Chemical Dictionary, 7th ed., 1966, page 760.

Primary Examiner—Morris O. Wolk
Assistant Examiner—Sidney Marantz
Attorney, Agent, or Firm—Neal J. Mosely; Russell L. Brewer

[57] ABSTRACT

Matte finish synthetic sausage casing made by incorporating a fibrilla filler material having an average diameter of 16–20 microns and an average length of 40–110 microns in the material used to manufacture the casing. The casing, which may be made of regenerated cellulose or synthetic hydrophilic polymers, such as polyvinyl alcohol, may be of the unreinforced type or of the fibrous paper reinforced type. A preferred filler material is fibrous cellulosic floc.

11 Claims, 1 Drawing Figure

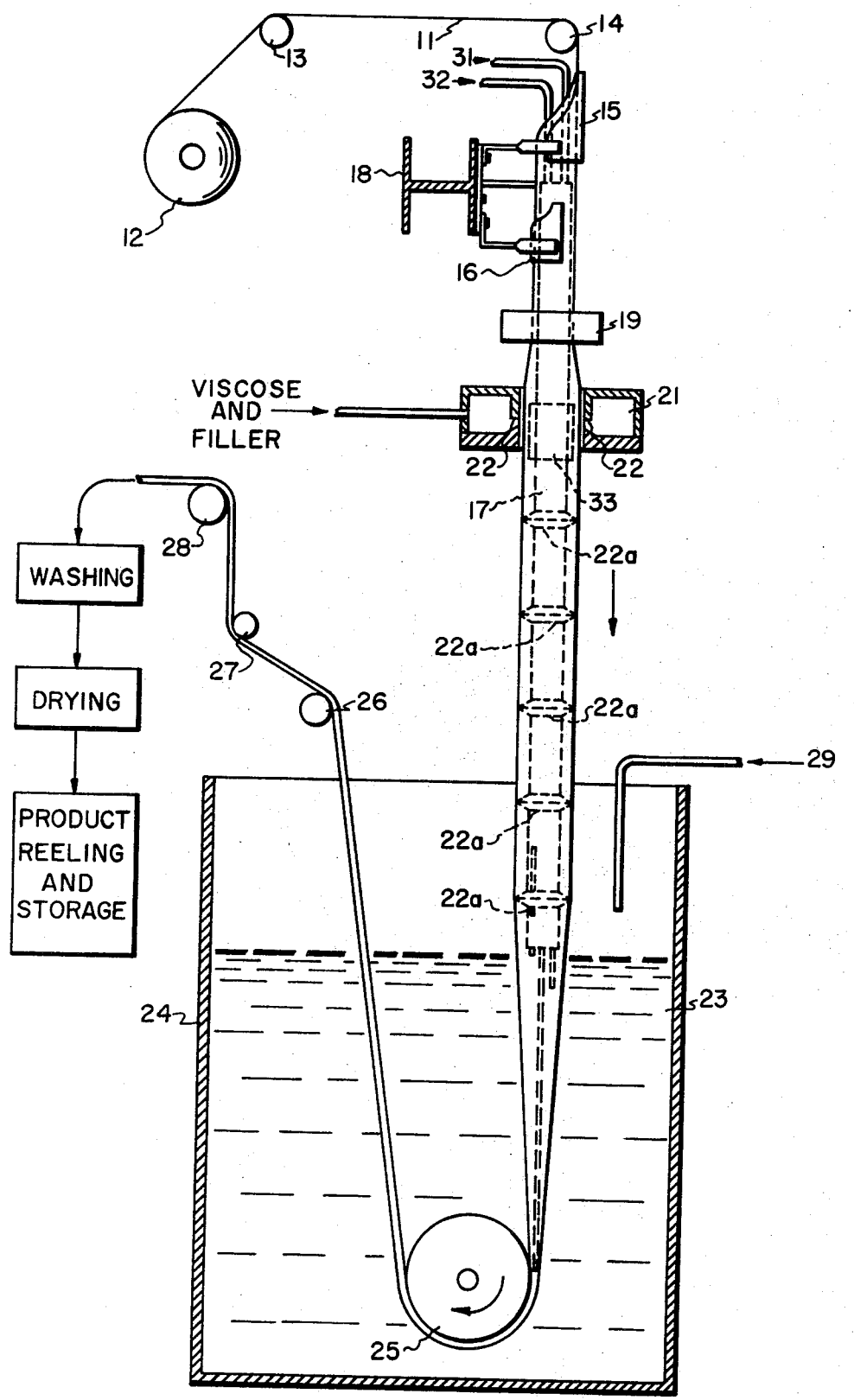

MATTE FINISH SAUSAGE CASING

BACKGROUND OF THE INVENTION

This invention relates to new and useful improvements in sausage casings.

Dry sausage, of which the various salami and cervelats are prime examples, is conventionally processed by drying rather than cooking, hence the same. Dry sausage is ordinarily served cold, without further cooking by the housewife.

The manufacture of dry sausage customarily involves mixing desired proportions of fat and lean meats, beef or pork or mixtures thereof, with selected spices, seasonings, and curing materials to form an emulsion which is initially cured at a few degrees above freezing (36° to 38°F) for two or three days depending on the size of the meat particles so that they will be preserved sufficiently to be smoked and dried.

The chill cured meat emulsion is then firmly packed into casings of suitable size and shape, and the ends of the casings are tied ready for delivery to the drying room or smokehouse, depending on the type of sausage. The stuffed dry sausage is smoked and then dried, while unsmoked dry sausage is dried only. The drying or curing time will vary with the particular type of sausage being processed and to some extent with the processing conditions. However, 60 to 90 days is usually considered a minimum time, and periods of 120 to 180 days or more are used under some circumstances.

The processing of dry sausage is described fully in "Sausage and Ready-to-Serve Meats", published by the American Meat Institute. The term "dry sausage" as used herein includes the entire range of dry and semi-dry sausages. The semi-dry sausages include the thuringer cervelates which are dried for about 10 days; other semi-dry sausages may be dried for as short a time as two to six days. Dry sausage is usually sold in three different forms: first, new sausage or semi-dry sausage, about 10 to 25 days after smoking (having about 20% shrinkage); second, medium dry sausage about 30 to 60 days after smoking (having about 32% shrinkage); and third, dry sausage, about 60 to 90 days or more after smoking (having about 40% shrinkage).

Previously, the sausage meat emulsions were stuffed into casings formed of natural materials or animal products such as sewn beef middles and hog casings. More recently, considerable interest has been developed in utilizing certain synthetic materials out of which casings could be formed. Particularly, the industry has turned to the use of casings formed of regenerated cellulose per se or of the product known in the art as fibrous casing and which is composed of cellulosic fibers, preferably a long fiber saturating tissue, impregnated with and held together by regenerated cellulose. Various synthetic hydrophilic polymers have also been found suitable for manufacture of sausage casings; suitable polymers being polyvinyl alcohol, amylose, alginic acid polymers, etc. These synthetic polymers are particularly useful in manufacture of fibrous casing, wherein cellulosic fibers or saturating tissues are impregnated with and held together by the polymer.

The use of such synthetic materials is not only desirable because of the greater control over the supply that can be exercised in keeping up with the rapid growth and demand of the various packaged and/or cured meat products, but also because the materials can be conventionally synchronized and extruded into seamless tubular forms of preselected diameter. Most importantly, casings formed of the aforesaid fibrous material, unlike the natural product, can be made sufficiently flexible as well as durable to be advantageously used in the stuffing step, while also being sufficiently nonelastic that they will not stretch out of shape during or subsequent to stuffing, but will retain a more constant shape and size corresponding to that to which it was initially designed.

This, of course, permits a definite relation to be established between the number of slices of the sausage and weight which may be assembled as a unit, and is obviously a highly desirable characteristic in the mechanical high speed packaging methods employed today. In addition, the synthetic casings are much more sanitary than natural casings, and are more economical to use where they do not require tying with strings to maintain their shape.

However, one of the essential drawbacks of such synthetic casing materials is their lack of ability to shrink with the sausage during the drying of the sausage emulsion. In the preparation of dry sausages, the sausage tends to shrink away from the synthetic casing and leave gaps between the meat and the casing in which there is a tendency for mold and/or so called "brown ring" to develop. This trouble is not encountered where natural casings are used since natural casings tend to expand and contract with the sausage during curing.

The problem of producing synthetic casings which adhere satisfactorily to dry sausages during preparation thereof has been at least partially solved by the application of certain proteinaceous coatings, such as casein, collagen, gelatin, and the like to the interior of such casings. These coatings have been applied by introduction into the casing in the form of a slug or bubble of a coating solution which coats the interior of the casing as the casing is moved past the slug or bubble. This method of interior coating of casings has the disadvantage that there is insufficient control over the uniformity of the coating which is applied, and it is difficult to determine precisely when the slug or bubble of coating liquid is exhausted and a new one is required. An alternate method of providing an interior adherent coating which has been quite successful is described in U.S. Pat. No. 3,645,760. In that method, the proteinaceous coating is applied to the saturating tissue and dried at the time of manufacture of the tissue. The tissue is then used in the manufacture of fibrous casing with the coated surface on the inside of the tube.

This invention is based on the discovery that improved synthetic sausage casings, both of the unreinforced and the fibrous reinforced type, can be made by adding a fibrilla filler material to the material that is employed to form the casing. The fibrilla filler material may be cellulosic, mineral, synthetic, or proteinaceous. In the case of regenerated cellulose casings, the fibrilla filler material is mixed with the viscose that is employed to form the casing.

The fibrilla filler material serves to alter the surface properties of the hydrophilic synthetic casings so as to make them look and feel more like the natural intestine material. Polymeric binders may be used with the filler materials to enhance the adhesion of the filler to the material used to form the casing. An added advantage of the use of polymeric binders where the casings are made from viscose is that the incorporation of polymeric binders in the regenerated cellulose filler material casing reduces the moisture vapor transmission rates of the cellulose casing.

When the filler material of the present invention is used in regenerated cellulose casing, the casing has a different physical response to stuffing practices than ordinary regenerated cellulose or fibrous casing. The filler containing cellulose casing exhibits a higher modulus, i.e., it is somewhat stiffer and less stretchy than conventional cellulose casing. By balancing the lowered viscose addition with the amount of filler mixed with the viscose, a superior dry sausage casing can be produced without a drastic change in the stretch and performance characteristics of the original casing.

The filler material may be a proteinaceous, synthetic, mineral or cellulosic material, although cellulosic materials, treated or untreated, are preferred. It is preferred to use fibrous filler materials for manufacturing the synthetic casings according to the present invention. The filler materials can be pretreated on their surface with isocyanates, epoxides, polyethyleneimines, or other types of adhesive binders so as to modify their interaction with the casing material and thus provide variations in strength and stretch qualities. The binder is present on the filler in amounts ranging from about 1 to 5%.

The preferred filler material is cellulosic floc made from chemically purified wood cellulose fibers of high alpha content. The preferred fibrilla material consists of fibers of an average diameter between 16 and 20 microns, having an average length of about 40 to 110 microns. The cellulose fiber additives may be surface treated, before incorporation in the casing-forming material, with any of the well-known polymeric adhesive binders, such as isocyanates, epoxides, polyethyleneimines, polyamides, and the like to enhance their interaction with the casing material and provide a variety of stretch characteristics.

Although regenerated cellulose is the most common material for casings for dry sausage, it is well-known that a variety of synthetic hydrophilic polymers can be used for the manufacture of sausage casings. The most likely polymers for this purpose are polyvinyl alcohol, polyvinyl ester-polyvinyl alcohol copolymers, polyhydroxyacrylics, amylose, alginates, etc. The hydrophilic polymeric compositions (other than cellulose) used to make sausage casings according to the present invention include the necessary crosslinking materials to prevent the reswelling or dissolution of the polymers upon subjection to hot water processing. A preferred synthetic hydrophilic polymer for making sausage casings is a polyvinyl alcohol copolymer having a degree of substitution of OH between about 60 and 99.

Where synthetic hydrophilic polymers are used to make sausage casings, they may be of the unreinforced type or of the fibrous paper reinforced type as in the case of regenerated cellulose casings. The filler materials are incorporated in the polymer from which the polymer is to be formed, by mixing the filler material in with a suspension, solution, or emulsion of the polymer, or by mixing the filler material into a melt of the polymer. Conventional thickeners may be incorporated in polymer-filler mixtures to facilitate formation of casings of uniform thickness. In addition, the inclusion of well-known adhesion promoters in small amounts in the polymer-filler mixture will not adversely affect the controlled moisture vapor transmission rate of the casings so produced. These adhesion promoters are preferably incorporated in the polymer-filler mixture by treating the surface of the filler material prior to incorporation in the casing polymer with an adhesive binder, such as an isocyanate, epoxide, polyethyleneimine, polyamide, and the like.

Polyvinyl alcohol is particularly enhanced by incorporating a filler into it, as the filler modifies the stretch characteristics of polyvinyl alcohol when wet to make it a superior sausage casing material. In particular, when filled polyvinyl alcohol is used to make a reinforced casing, it has less stretch then reinforced casing made of regenerated cellulose.

In addition to having a desirable matte or delustered finish, unreinforced sausage casings made according to the present invention are much easier to open up after being wound on a reel. After sausage casings are dried, they are wound on a reel for storage; however, conventional unreinforced casings are often difficult to open up to introduce sausage emulsion. However, unreinforced synthetic sausage casings made according to the present invention open easily.

Where it is desired to produce additional effects on the casing other additives can be mixed with the filler prior to its incorporation in the casing material. For example, $TiO_2$ can be used for opaquing, and food grade organic and inorganic pigments can be used to color the casing.

In the manufacture of synthetic meat casings of regenerated cellulose from viscose, the procedures have become relatively standardized over many years of manufacturing such casing. Unreinforced or nonfibrous casings are generally made by extruding viscose through an annular die into a coagulating medium to form a tubular film of desired size and weight. In some cases, viscose is extruded through a slit to form a film or sheet or regenerated cellulose which is subsequently cemented or otherwise joined along a longitudinally extending joint to form a tube suitable for use as a casing.

When fibrillar filler material is mixed with viscose in accordance with the present invention and extruded with the viscose into an acid coagulating and regenerating bath, the filler material is dispersed throughout the resulting regenerated cellulose film and produces a casing having a matte finish and improved physical properties. In carrying out this invention, the fibrilla filler material is mixed with the viscose in an amount ranging from about 5 to 20% based on the cellulose content of viscose. Where synthetic polymers are used to form the casings, the filler material is mixed with the polymer and extruded through an annular die to form a tubular film of desired size and weight. Alternatively, the polymer-filler material may be extruded through a slit to form a film or sheet which is subsequently cemented or otherwise joined along a longitudinally extending joint to form a tube suitable for use as a casing.

Fibrous casings are formed by extrusion of viscose through a die into a fibrous reinforcing material, saturating tissue, curved into tubular or cylindrical form, followed by regeneration of the cellulose in an acid regenerating bath. The standard commercial procedure for the formation of fibrous casing involves the continuous feeding of a sheet of long fiber saturating tissue paper of natural cellulosic fibers, such as hemp paper, over rollers or other guide members which cause the paper to curve into a tubular shape and pass through the extrusion die in the form of a cylinder, while the viscose solution is simultaneously extruded through the die to saturate and coat the paper. The subsequent regeneration of the viscose in the acid bath results in the formation of a tube of paper-reinforced, regenerated cellulose, known as fibrous casing.

To make a fibrous casing according to the present invention, the fibrilla filler is mixed with the viscose solution used to coat the paper. The filler material is mixed with the viscose solution in an amount ranging from about 5 to 40%, calculated on the weight of cellulose in the viscose.

Where it is desired to make a reinforced casing from synthetic hydrophilic polymeric material, the filler is mixed with a solution, suspension, or emulsion of the polymer used to coat the paper. The filler material is mixed with the polymer solution, suspension of emulsion in an amount ranging from about 5 to 40%, calculated on the weight of the polymer.

When the casing, either reinforced or clear, made in accordance with this invention, containing fibrilla filler material is to be used for processing dry sausage, it may be provided with an internal proteinaceous coating in accordance with well known prior art techniques. When fibrous casings made in accordance with this invention is to be used for processing dry sausage the reinforcing tissue may be precoated with proteinaceous material as described in U.S. Pat. No. 3,645,760.

DESCRIPTION OF THE PREFERRED EMBODIMENTS

The following non-limiting examples are illustrative of the scope of this invention.

Example 1

In carrying out this invention, the fibrillar filler material was a finely-divided wood-pulp derivative of at least 99.5% cellulose when dry. The approximate average particle length was 50 microns, and the approximate average particle thickness was 17 microns. An alkaline aqueous slurry of the filler was mixed with the viscose in an amount sufficient to provide 10% of the cellulose filler based on the cellulose content of the viscose.

Referring to the drawing, there is shown a somewhat diagrammatic view of the process and apparatus used in the preparation of fibrous casing in accordance with this invention. In the drawing, a ribbon of paper 11, which is formed of natural cellulosic fibers and which is preferably a long-fiber, hemp paper (saturating tissue) weighing 12 ½ pounds per ream, passes from roll 12 over rollers 13 and 14 and around guides 15 and 16 which form the paper into tubular form.

The paper then proceeds downwardly over mandrel 17 which may be a steel pipe having an outside diameter of 2 to 7 inches more or less, depending on the size of the tube or casing which is to be produced. The mandrel 17 may be of a suitable length, conveniently about 30 feet long, and, as shown, can be suspended from a suitable support such as an I beam 18 or the like. The paper ribbon 11, now shaped in the form of a tube, passes downwardly over the mandrel 17, through a forming ring 19 which is a metallic ring having an inside diameter slightly larger than the diameter of the paper tube passing through it. The forming ring 19 functions to maintain the paper in the form of a tube until it reaches the coating die 21.

Coating die 21 is a hollow annular structure of metal or the like and contains an annular opening 22, circumferentially of its inner face, through which viscose is applied to the outer surface of the downwardly moving paper tube. Viscose is supplied under positive pressure from the chamber of die 21 through the annular slit 22 to thoroughly impregnate and coat the paper tube which is moving downwardly through the die. The viscose supplied through die 21 contains a small amount of fibrilla wood pulp filler, viz. 10% based on the cellulose content of the viscose.

The sleeve 33, formed of metal or the like, which is shrunk onto the mandrel 17, functions to effect more uniform application of viscose through the orifice 22 as the paper tube 11 passes downwardly thereover. A number of slip rings 22a are positioned on mandrel 17 at preselected intervals. The slip rings 22a are preferably shrunk onto the mandrel at about three-foot intervals and function to keep the inside wall of the viscose-impregnated tube from scraping against the outside wall of mandrel 17 as the tube moves downwardly.

Continuing in its downward movement, the viscose-impregnated paper tube 11 enters coagulating bath 23 contained in vessel 24. On contact with the acid bath, the viscose impregnated in and coated under paper tube 11 is coagulated and regenerated. The conversion of viscose to regenerated cellulose begins and continues within the bath as the tube moves around roller 25 and continues as the tube moves over and under wiper rods 26 and 27, roller 28, and then through washing baths and drying tunnels not shown here, but being substantially the same as those used in the art of making regenerated cellulose casing, as exemplified in U.S. Pat. No. 1,937,225. For convenience in understanding the overall invention, the steps of washing, drying, reeling, and storage of the product casing are shown diagrammatically without reference to any particular apparatus for accomplishing those steps.

In carrying out the acid regeneration of cellulose in the paper tubing, acid for the bath 23 is supplied through pipe 29. The same kind and concentration of acid is supplied to the interior of the casing through the mandrel 17 through a pipe 31. Spent acid from within the casing is withdrawn through pipe 32 at a rate which is balanced by incoming acid, as shown. In the preparation of casing in accordance with this process, the speed of the casing in its downward movement is approximately 20–50 feet per minute and the contact time in the acid bath 23 is of the order of 15–36 seconds.

When the casing is to be used in processing dry sausages it may be provided with an internal proteinaceous coating in accordance with well known prior art techniques. Alternatively, the reinforcing tissue paper may be precoated as described in U.S. Pat. No. 3,645,760.

Example 2

Large diameter cellulosic meat casings (known in the trade as Miscellaneous casings) are prepared from standard viscose solutions containing 10% wt., based on cellulose content of the viscose, of a fibrous cellulose floc having an approximate average particle length of 50 microns and an approximate average particle thickness of 17 microns, 95% of which will pass through a 100 mesh screen. Casings are prepared by extruding the viscose-filler mixture through a die having an annular orifice into a regenerating and coagulating bath. The casing may be manufactured at speeds ranging from 15 to 45 feet per minute, and in some cases at speeds as high as 75 feet per minute. The viscose-filler is extruded into a coagulating and regenerating bath containing ammonium sulfate and/or sodium sulfate, plus sulfuric acid. In some cases, the coagulating and regenerating baths are separated, the coagulating bath being primarily salts and the regenerating bath primarily acid. The casing is washed to remove salts, acids, and by-products and may be passed through a dilute caustic premercerizer bath to neutralize any acid carryover from the last wash. After thorough washing, the casing is passed through an aqueous glycerol plasticizing bath. The casing is then dried in a continuous dryer under inflation with air and is wound on storage reels. The casing produced in accordance with this example is substantially easier to open for stuffing than is casing made without the cellulose filler.

Example 3

The filler material used to produce the fibrous casing of the present example is a fibrous cellulose floc having an approximate average particle length of 50 microns and an approximate average particle thickness of 17 microns, 95% of which will pass through a 100 mesh screen. The cellulose floc is treated by stirring it in a solution of pH 10 of polyethyleneimine having a molecular weight of 60,000 for 2 hours to effect a 1% load of the polyethyleneimine on the floc. The treated floc is mixed with viscose and metered into a stream of viscose just prior to the extrusion nozzle. The viscose used has a 7.0% cellulose content and 6.0% alkali content. The viscose filler suspension is fed into the main viscose solution using a metering pump. The final mixture is extruded through an extrusion nozzle and regenerated in a conventional coagulating and regenerating bath (ammonium and/or sodium sulfate plus sulfuric acid).

This procedure is used in the extrusion of clear regenerated cellulose films, wherein the filler-containing viscose is extruded through an annular die into the coagulation and regeneration bath (ammonium and/or sodium sulfate plus sulfuric acid). The procedure is also used in a process for making fibrous casing wherein the viscose is extruded through an annular die to coat and to impregnate a preformed tube of reinforcing paper consisting of a long fiber hemp paper. The impregnated and coated paper is passed into the coagulation and regeneration bath to produce a fibrous reinforced casing containing polyethyleneimine treated cellulose floc dispersed through the walls thereof. When these casings are provided with an internal proteinaceous coating and are used in processing dry sausages, the casings adhere to the sausage during extended processing. The treated floc components are not damaged during the presoaking of the casing in preparation for stuffing with sausage emulsion and the casing generally has an appearance simulating that of natural gut casing.

Example 4

Twenty grams of fibrous cellulose floc having an approximate average particle length of 50 microns and an approximate average particle thickness of 17 microns are stirred for 2 hours in one liter of water containing 3.5 grams of dispersed Nacconate H 12 aliphatic diisocyanate (made by National Aniline Division of Allied Chemical and Dye Corp.).

The treated floc is mixed with viscose and metered into a stream of viscose just prior to the extrusion nozzle. The viscose has a 7.0% cellulose content and 6.0% alkali content. The viscose-filler suspension was fed into a main viscose solution using a metering pump. The final mixture is extruded through an annular die into a sodium sulfate-sulfuric acid regeneration and coagulation bath, washed, plasticized, dried, and reeled. The casing containing 5% cellulose floc, is substantially easier to open than casing not containing the filler.

Example 5

Fibrous cellulosic floc is treated by stirring it in a pH 10 solution of polyethyleneimine (molecular weight 60,000) for 3 hours to effect a 1.5% load of polyethyleneimine on the floc. The treated floc is mixed with viscose just prior to the extrusion nozzle. The viscose-filler mixture used has a 7.0% cellulose content, 6.0% alkali content, and 1.4% floc content. The viscose-filler suspension is fed into the main viscose solution using a metering pump.

The filler-containing viscose is extruded through an annular die to coat and to impregnate a preformed tube of reinforcing paper consisting of a long fiber hemp paper. The impregnated and coated paper is passed into the coagulation and regeneration bath to produce a fibrous reinforced casing containing polyethyleneimine treated cellulose dispersed through the regenerated cellulose thereon. After thorough washing, the casing is plasticized with glycerol, dried, and reeled. The casing has a matte finish and improved stretch and tensile properties. When provided with an internal proteinaceous coating, the casing is particularly useful for processing dry sausage.

Example 6

Fibrous cellulose floc having an approximate average particle length of 50 microns and an approximate average particle thickness of 17 microns, 95% of which will pass through a 100 mesh screen, is mixed with a 5% aqueous solution of polyvinyl alcohol having a degree of substitution (of OH) of about 99%. The mixture contains cross-linking agent and about 20% floc based on the polyvinyl alcohol. The mixture is extruded through an annular die to coat and impregnate a preformed tube of reinforcing paper consisting of a long fiber hemp saturating tissue paper and the impregnated tube passed through an aqueous acidic ammonium sulfate coagulating bath containing formaldehyde. The tube is washed and finally plasticized in an aqueous glycerol solution dried under inflation with air, and reeled. The resulting casing has a matte finish and superior tensile and stretch properties. As is, the casing is useful for processing bologna sausages. When provided with an internal coating of protein, e.g. gelatin, the casing is particularly useful for processing dry sausage.

Example 7

Fibrous cellulose floc having an approximate average particle length of 50 microns and an approximate average particle thickness of 17 microns is stirred with polyethyleneimine having a molecular weight of 60,000 for 2 hours to produce a 1% load of polyethyleimine on the cellulose floc. The treated cellulose floc is used in the

Example 8

The procedure of Example 1 is repeated substituting chopped polyvinyl alcohol fibers for the cellulosic floc. The polyvinyl alcohol fibers are of the same particle size as the cellulosic floc and are incorporated in the viscose in the same manner as described in Example 1. The product produced in accordance with this variation of the procedure of Example 1 has the desired matte finish and when coated internally with a proteinaceous material is especially useful in the processing of dry sausages.

Example 9

The procedure of Example 2 is repeated substituting chopped polyvinyl alcohol fibers for the cellulosic floc. The chopped polyvinyl alcohol fibers are of the same dimensions as the cellulosic fibers used in Example 2. The polyvinyl alcohol fibers are injected with the viscose and produce a product having a desired matte finish which is substantially easier to open for stuffing than is casing made without the filler material.

Example 10

The procedure of Example 1 is repeated substituting chopped soya protein fibers for the cellulosic floc. The soya protein fibers are of the same particle size as the cellulosic floc and are incorporated in the viscose in the same manner as described in Example 1. The product produced in accordance with this variation of the procedure of Example 1 has the desired matte finish and when coated internally with a proteinaceous material is especially useful in the processing of dry sausages.

Example 11

The procedure of Example 2 is repeated substituting chopped soya protein fibers for the cellulosic floc. The chopped soya protein fibers are of the same dimensions as the cellulosic fibers used in Example 2. The chopped soya protein fibers are injected with the viscose and produce a product having a desired matte finish which is substantially easier to open for stuffing than is casing made without the filler material.

Example 12

The procedure of Example 1 is repeated substituting asbestos fibers for the cellulosic floc used in Example 1. The asbestos fibers are of the same particle size as the cellulosic floc in Example 1. The asbestos fibers are injected with the viscose and produce a casing having the desired matte finish. When the casing is provided with internal proteinaceous coating it is especially useful in the processing of dry sausages.

Example 13

The procedure of Example 2 is repeated substituting asbestos fibers for the cellulosic floc. The asbestos fibers are of about the same dimensions as the cellulosic fibers used in Example 2. The asbestos fibers are injected with the viscose and produce a matte finish casing which is substantially easier to open for stuffing than is casing made without the filler material.

We claim:

1. A method of preparing a matte finish synthetic sausage casing which comprises forming a thin walled continuous tube of a hydrophilic polymer selected from the group consisting of regenerated cellulose, polyvinyl alcohol, amylose, and alginates in admixture with 5 to 40% wt., based on said polymer, of a fibrilla filler material selected from the group consisting of cellulose fibers, polyvinyl alcohol fibers, soya protein fibers, and asbestos fibers, said fibrilla filler material having an average diameter of 16 to 20 microns and an average length of 40 to 110 microns.

2. A method in accordance with claim 1 of preparing a matte finish polyvinyl alcohol sausage casing comprising forming a tube from a long fiber saturating tissue, preparing a suspension by addition of said fibrilla filler material to an aqueous solution of polyvinyl alcohol in the proportion of from 5 to 40 parts by weight of filler material per 100 parts by weight of polyvinyl alcohol, impregnating said tube with said polyvinyl alcohol-filler suspension, coagulating and hardening said polyvinyl alcohol, and washing, plasticizing and drying the resulting case.

3. A method in accordance with claim 2 in which the filler is a cellulosic floc pretreated with from about 1 to 5% polyethyleneimine by weight of fibrous cellulosic floc.

4. A method in accordance with claim 1 of preparing a matte finish cellulosic sausage casing wherein viscose is extruded through an annular die into a coagulating and regenerating medium, comprising mixing said fibrilla filler material uniformly in viscose immediately prior to extrusion thereof, said filler material being added in the proportion of from 5 to 40 parts by weight of filler material per 100 parts by weight of cellulose in the viscose.

5. A method in accordance with claim 4 in which the filler is a fibrilla cellulosic floc pretreated with from about 1 to 5% polyethyleneimine by weight of said cellulosic floc.

6. A method in accordance with claim 1 of preparing a matte finish regenerated cellulose sausage casing comprising forming a tube from a long fiber saturating tissue, preparing a suspension by addition of said fibrilla filler material to viscose in the proportion of from 5 to 40 parts by weight of filler material per 100 parts by weight of cellulose in the viscose, impregnating said tube with said viscose and filler material, regenerating cellulose in the viscose-impregnated tube, and washing, plasticizing, and drying the resulting casing.

7. A method in accordance with claim 6 in which the filler is cellulosic floc pretreated with from about 1 to 5% polyethyleneimine by weight of said floc.

8. A method in accordance with claim 6 in which said tissure is a long fiber hemp paper.

9. A matte finish synthetic sausage casing comprising a thin wall continuous tube of a hydrophilic polymer selected from the group consisting of regenerated cellulose, polyvinyl alcohol, amylose, and alginates containing 5 to 40% wt. based on said polymer of a fibrilla filler material selected from the group consisting of cellulosic floc, polyvinyl alcohol fibers, soya protein fibers, and asbestos fibers, said fibrilla filler material having an average diameter of 16 to 20 microns and an average length of 40 to 110 microns.

10. A matte finish regenerated cellulose sausage casing in accordance with claim 9 having a fibrilla cellulosic floc dispersed in the regenerated cellulose casing material.

11. A matte finish regenerated cellulose sausage casing in accordance with claim 10 in which the casing is reinforced with a long fiber saturating tissue.

* * * * *